(12) United States Patent
Yang et al.

(10) Patent No.: US 12,325,603 B2
(45) Date of Patent: Jun. 10, 2025

(54) COIL REPLACING DEVICE

(71) Applicant: WUXI LEAD INTELLIGENT EQUIPMENT CO., LTD., Jiangsu (CN)

(72) Inventors: Xiaofei Yang, Wuxi (CN); Er Cao, Wuxi (CN)

(73) Assignee: WUXI LEAD INTELLIGENT EQUIPMENT CO., LTD., Wuxi (CN)

( * ) Notice: Subject to any disclaimer, the term of this patent is extended or adjusted under 35 U.S.C. 154(b) by 313 days.

(21) Appl. No.: 18/152,269

(22) Filed: Jan. 10, 2023

(65) Prior Publication Data

US 2024/0076156 A1 Mar. 7, 2024

Related U.S. Application Data

(63) Continuation of application No. PCT/CN2022/129207, filed on Nov. 2, 2022.

(30) Foreign Application Priority Data

Sep. 5, 2022 (CN) .......................... 202211080328.X

(51) Int. Cl.
*B65H 19/20* (2006.01)
*B65H 19/18* (2006.01)
*B65H 35/00* (2006.01)

(52) U.S. Cl.
CPC ......... *B65H 19/1852* (2013.01); *B65H 19/20* (2013.01); *B65H 35/0013* (2013.01);
(Continued)

(58) Field of Classification Search
CPC B65H 19/20; B65H 19/1852; B65H 19/1873; B65H 35/0013; B65H 2301/4631
See application file for complete search history.

(56) References Cited

U.S. PATENT DOCUMENTS 6,013,148 A * 1/2000 Bluemle ............ B65H 19/1873
156/507
11,753,264 B2 * 9/2023 Cao .................... B65H 19/1852
242/532.3
(Continued)

FOREIGN PATENT DOCUMENTS

CN 110600812 A 12/2019
CN 112186272 A 1/2021
(Continued)

OTHER PUBLICATIONS

International Search Report issued on May 16, 2023, in corresponding International Application No. PCT/CN2022/129207, 5 pages.

*Primary Examiner* — Sang K Kim
(74) *Attorney, Agent, or Firm* — Maier & Maier, PLLC

(57) ABSTRACT

A coil replacing device. Material tapes output by a first unreeling assembly and a second unreeling assembly can be alternately used as a working materials tape and a spare materials tape. When the unreeling of the working material tape by the first unreeling assembly is about to be finished, a first cutting assembly cuts off the working material tape fixed by a fixing mechanism and a first positioning assembly, and the spare material tape unreeled by the second unreeling assembly can be aligned with the working material tape fixed by the first positioning assembly. Then, a swing assembly drives an adhesive attaching driver to swing from an adhesive preparation position to an adhesive attaching position, and an adhesive attaching mechanism drives two suction plates to be folded, connecting the spare material tape with the working material tape to form a new working material tape.

19 Claims, 8 Drawing Sheets

(52) U.S. Cl.
CPC .............. *B65H 2301/46314* (2013.01); *B65H 2406/351* (2013.01)

(56) References Cited

U.S. PATENT DOCUMENTS

| | | | | |
|---|---|---|---|---|
| 2008/0196819 A1* | 8/2008 | Hafner | ............... | B65H 19/1852 156/507 |
| 2010/0186879 A1* | 7/2010 | Machamer | ............. | B65H 19/20 156/159 |
| 2017/0137251 A1* | 5/2017 | Sato | ........................ | B65H 20/12 |

FOREIGN PATENT DOCUMENTS

| | | |
|---|---|---|
| CN | 112828603 A | 5/2021 |
| CN | 114314109 A | 4/2022 |
| JP | H09309649 A | 12/1997 |
| WO | 2024050948 A1 | 3/2024 |

* cited by examiner

COIL REPLACING DEVICE

TECHNICAL FIELD

The application relates to the technical field of lithium battery equipment, in particular to a coil replacing device.

BACKGROUND

During lithium battery production by a winding process, an anode plate, a separator and a cathode plate need to be wound to form a battery cell. Before an electrode plate enters a winding device for winding, a tab needs to be welded to a specific position of the electrode plate, and then the tab is wound together with the electrode plate.

Generally, tab welding equipment provides tabs through unreeling. An unreeled tab tape is cut to form tab pieces, and then welded to electrode plates. In order to ensure the continuity of the production process, when one tab coil is used up, a new tab coil needs to be supplied in time, that is, coil replacing. In the process of tab coil replacing, a working material tape and a spare material tape need to go through a series of processes including cutting, aligning and adhesive tape attaching. At present, some processes still require manual operation, which leads to low coil replacing efficiency of a coil replacing device.

SUMMARY

In view of the above problem, the invention provides a coil replacing device capable of improving coil replacing efficiency.

A coil replacing device comprises:

an unreeling mechanism, comprising a first unreeling assembly and a second unreeling assembly, material tapes unreeled and output by the first unreeling assembly and the second unreeling assembly being alternately used as a working material tape and a spare material tape;

a fixing mechanism, being arranged downstream of the unreeling mechanism and comprising a first fixing assembly and a second fixing assembly, the first fixing assembly and the second fixing assembly being capable of fixing the material tapes unreeled and output by the first unreeling assembly and the second unreeling assembly respectively;

a tape connecting mechanism, being arranged downstream of the fixing mechanism and comprising a first cutting assembly and a first positioning assembly, the working material tape unreeled and output by the unreeling mechanism being capable of passing through the fixing mechanism and the first positioning assembly in sequence, the first cutting assembly being capable of cutting off the working material tape fixed by both the fixing mechanism and the first positioning assembly, and the fixing mechanism being capable of reciprocating in a first direction to make the spare material tape fixed thereby align with the working material tape fixed by the first positioning assembly; and an adhesive attaching mechanism, comprising an adhesive attaching driver, suction plates and a swing assembly, two suction plates being mounted at a driving end of the adhesive attaching driver and capable of being folded or unfolded under driving of the adhesive attaching driver, and the swing assembly being capable of driving the adhesive attaching driver to swing between an adhesive preparation position and an adhesive attaching position;

wherein when the adhesive attaching driver is located at the adhesive preparation position, the two unfolded suction plates are capable of receiving and sucking adhesive pieces; and when the adhesive attaching driver swings to the adhesive attaching position, the two unfolded suction plates are located on an upper side and a lower side of the aligned spare material tape and working material tape, respectively, and as the adhesive attaching driver drives the two suction plates to be folded, the adhesive pieces sucked by the suction plates are attached to the aligned spare material tape and working material tape.

In one embodiment, the fixing mechanism is fixedly connected with the unreeling mechanism to make the first unreeling assembly and the second unreeling assembly be capable of moving in the first direction with the fixing mechanism, synchronously.

In one embodiment, the coil replacing device further comprises a base plate and a transmission mechanism, the unreeling mechanism further comprises a moving plate slidably mounted on the base plate in the first direction, the first unreeling assembly, the second unreeling assembly and the fixing mechanism are mounted on the moving plate, and the transmission mechanism is being capable of driving the moving plate to slide in the first direction to drive the fixing mechanism to reciprocate in the first direction.

In one embodiment, the unreeling mechanism further comprises a vertical plate mounted on the moving plate and extending in a direction perpendicular to a surface of the base plate, and the first unreeling assembly and the second unreeling assembly are both arranged on the vertical plate.

In one embodiment, the fixing mechanism passes through a first position and a second position while reciprocating in the first direction, the tape connecting mechanism further comprises a second positioning assembly and a second cutting assembly located upstream of the second positioning assembly, and the second positioning assembly is located at a side of the first positioning assembly in the first direction and is spaced from the first positioning assembly; when the fixing mechanism passes through the first position, the first fixing assembly is aligned with the second positioning assembly, and the second fixing assembly is aligned with the first positioning assembly, the spare material tape unreeled by the first unreeling assembly passes through the second cutting assembly and the second positioning assembly in sequence, and the second cutting assembly is capable of cutting off the spare material tape fixed by both the first fixing assembly and the second positioning assembly.

In one embodiment, the second cutting assembly comprises an upper cutter, a lower cutter and a cutting driver, the spare material tape unreeled by the first unreeling assembly is supported by the lower cutter when passing through the second cutting assembly, and the lower cutter is located on a side, facing away from the second positioning assembly, of the upper cutter.

In one embodiment, the second positioning assembly comprises a supporting plate, a pressing rod and an elastic member, the pressing rod is capable of pressing the spare material tape on a supporting surface of the supporting plate under an action of the elastic member, the lower cutter is fixedly connected with the supporting plate, and a supporting surface of the lower cutter is flush with the supporting surface of the supporting plate.

In one embodiment, a guide groove for the spare material tape to pass through is formed in a surface of the supporting plate.

In one embodiment, the tape connecting mechanism further comprises a third positioning assembly and a third cutting assembly located upstream of the third positioning assembly, the third positioning assembly is located on a side, facing away from the second positioning assembly, of the first positioning assembly and is spaced from the first positioning assembly, when the fixing mechanism passes through the second position, the first fixing assembly is aligned with the first positioning assembly, the second fixing assembly is aligned with the third positioning assembly, the spare material tape unreeled by the second unreeling assembly passes through the third cutting assembly and the third positioning assembly in sequence, and the third cutting assembly is capable of cutting off the spare material tape fixed by both the second fixing assembly and the third positioning assembly.

In one embodiment, the tape connecting mechanism further comprises a first driver connected with the first cutting assembly in a driving mode and capable of driving the first cutting assembly to move close to or away from the material tape between the first positioning assembly and the fixing mechanism.

In one embodiment, the coil replacing device further comprises an adhesive preparation mechanism capable of cutting unreeled adhesive tape into adhesive pieces and transporting the adhesive pieces to surfaces of the suction plates located at the adhesive preparation position.

In one embodiment, the adhesive preparation mechanism comprises an adhesive tape unreeling assembly, a pulling assembly and a cutting assembly, the adhesive tape unreeling assembly is for unreeling the adhesive tape, the pulling assembly is for pulling a preset length of adhesive tape above the suction plates, and the cutting assembly is for cutting the adhesive tape between the pulling assembly and the adhesive tape unreeling assembly to obtain the adhesive pieces loaded by the suction plates.

In one embodiment, the adhesive preparation mechanism further comprises a depressing assembly capable of fixing the adhesive tape between the pulling assembly and the adhesive tape unreeling assembly and driving the fixed adhesive tape to move toward the suction plates until the adhesive tape above the suction plates is sucked by the suction plates.

In one embodiment, the adhesive preparation mechanism further comprises a supporting base and a connecting plate slidably connected with the supporting base, and the depressing assembly comprises a pressing cylinder, a first clamping jaw and a second clamping jaw; the pressing cylinder is fixed to the connecting plate, the first clamping jaw is fixed to a moving end of the pressing cylinder, and the second clamping jaw is arranged below the first clamping jaw and fixedly connected with the connecting plate; and the adhesive tape pulled by the pulling assembly is capable of passing between the first clamping jaw and the second clamping jaw, the first clamping jaw is capable of cooperating with the second clamping jaw to clamp the adhesive tape under the driving by the pressing cylinder, and as the connecting plate slides towards the suction plates, the depressing assembly drives the clamped adhesive tape to move towards suction surfaces of the suction plates.

In one embodiment, the adhesive attaching mechanism further comprises a transfer assembly capable of driving the adhesive attaching driver to move in the first direction to make the two suction plates sequentially pass through a position for receiving the adhesive pieces output by the adhesive preparation mechanism, when the adhesive attaching driver is located at the adhesive preparation position.

In one embodiment, when the adhesive attaching driver is located at the adhesive attaching position, the transfer assembly is further capable of driving the adhesive attaching driver to move in the first direction, so that the two suction plates are capable of clamping the spare material tape and the working material tape aligned between the first positioning assembly and the fixing mechanism, when the two suction plates are folded.

In one embodiment, the transfer assembly comprises a first transfer structure and a second transfer structure, the first transfer structure is capable of driving the adhesive attaching driver to move in the first direction to make the two suction plates sequentially pass through the position for receiving the adhesive pieces output by the adhesive preparation mechanism, and the second transfer structure is capable of driving the adhesive attaching driver to move in the first direction, so that the two suction plates are capable of clamping the spare material tape and the working material tape aligned between the first positioning assembly and the fixing mechanism, when the two suction plates are folded.

In one embodiment, the first transfer structure comprises a first slide plate and a first transfer cylinder, and the second transfer structure comprises a second slide plate and a second transfer cylinder; and the second slide plate is slidably mounted on the first slide plate in the first direction, the adhesive attaching driver is mounted on the second slide plate, the first slide plate is capable of being driven by the first transfer cylinder to slide in the first direction, and the second transfer cylinder is mounted on the first slide plate and capable of driving the second slide plate to slide in the first direction.

In one embodiment, the swing assembly comprises a support, a swing base and a swing driver, the swing base is rotatably mounted on the support, the adhesive attaching driver is fixedly mounted on the swing base, and the swing driver is capable of driving the swing base to rotate to make the swing base drive the adhesive attaching driver to swing between the adhesive preparation position and the adhesive attaching position.

In one embodiment, the swing base is rotatably mounted on the support through a pin shaft, the swing assembly further comprises a connecting rod, an end of the connecting rod is fixedly connected with the pin shaft, another end of the connecting rod is hinged to a moving end of the swing driver, and the moving end of the swing driver stretches out and draws back controllably, and drives the pin shaft to rotate through the connecting rod.

According to the coil replacing device, the material tapes output by the first unreeling assembly and the second unreeling assembly can be alternately used as a working materials tape and a spare materials tape. When the unreeling of the working material tape by the first unreeling assembly is about to be finished, the first cutting assembly cuts off the working material tape fixed by the fixing mechanism and the first positioning assembly, and by moving the fixing mechanism relative to the first positioning assembly in the first direction, the spare material tape unreeled by the second unreeling assembly can be aligned with the working material tape fixed by the first positioning assembly. Then, the swing assembly drives the adhesive attaching driver to swing from the adhesive preparation position to the adhesive attaching position, and the adhesive attaching mechanism drives the two suction plates to be folded, so that the adhesive pieces can be attached to the aligned spare material tape and working material tape, thus connecting the spare material tape with the working material tape to form a new working material tape, and a new reel can be loaded onto the first unreeling assembly to serve as a spare material tape. In this way, the coil replacing device can realize automatic coil replacing, and coil replacing efficiency is high.

BRIEF DESCRIPTION OF THE DRAWINGS

In order to more clearly explain the embodiments of the application or the technical scheme in the prior art, the following will briefly introduce the drawings needed in the description of the embodiments or the prior art. Obviously, the drawings in the following description only illustrate some embodiments of the application. For those of ordinary skill in the art, other drawings can be obtained according to the provided drawings without creative labor.

DETAILED DESCRIPTION OF THE EMBODIMENTS

Figure 1:
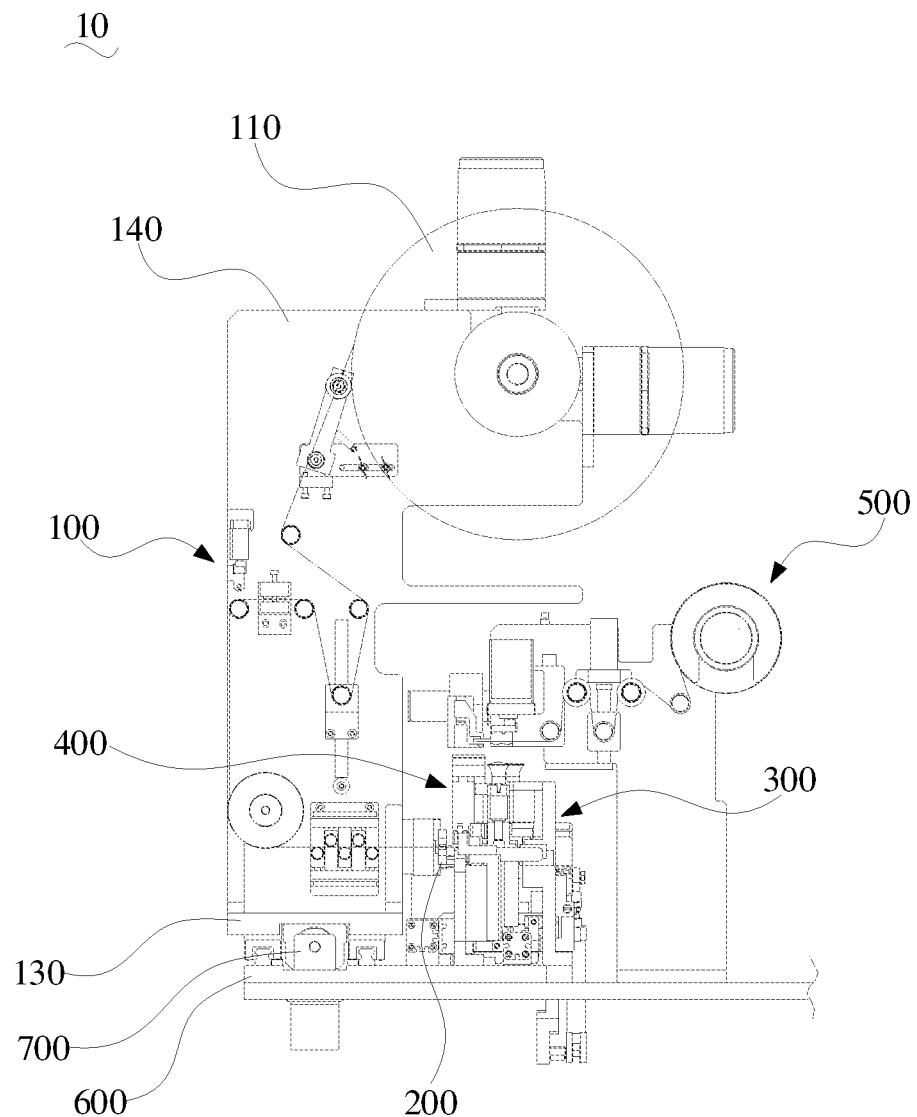
FIG. 1 is a front view of a coil replacing device in an embodiment of the application.

In order to make the above objects, features and advantages of this application more obvious and understandable, the following detailed description of this application will be made with reference to the accompanying drawings. In the following description, numerous specific details are set forth in order to provide a thorough understanding of the application. However, this application can be implemented in many other ways different from those described here, and those skilled in the art can make similar improvements without violating the connotation of this application. Therefore, this application is not limited by the specific embodiments disclosed below.

In the description of the application, it should be understood that directional or positional relationships indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential" are based on the directional or positional relationships shown in the drawings, which are only for the convenience of describing the application and simplifying the description, but do not indicate or imply that the referred devices or elements must have a specific orientation or be constructed and operated in a specific orientation, so they cannot be understood as limiting the application.

In addition, the terms "first" and "second" are only used for descriptive purposes, and cannot be understood as indicating or implying relative importance or implicitly indicating the number of indicated technical features. Therefore, the features defined with "first" and "second" may include one or more of the features explicitly or implicitly. In the description of this application, "multiple" means at least two, such as two, three, etc., unless otherwise specifically defined.

In the application, unless otherwise specified and defined, the terms "install", "connect", "attach" and "fix" should be understood in a broad sense. For example, it can be fixed connection, detachable connection or integrated connection; it can be mechanical connection or electric connection; and it can be direct connection, indirect connection through intermediate media or internal communication or interaction of two elements, unless otherwise explicitly defined. For those of ordinary skill in the art, the specific meaning of the above terms in the application can be understood in specific situations.

In this application, unless otherwise specified and limited, a first feature being "above" or "below" a second feature may mean that the first feature and the second feature are in direct contact, or the first feature and the second feature are in indirect contact through an intermediary. Further, the first feature being "above" the second feature may be that the first feature is directly above or obliquely above the second feature, or it only means that a level of the first feature is higher than that of the second feature; and the first feature being "below" the second feature may be that the first feature is directly below or obliquely below the second feature, or it only means that the level of the first feature is lower than that of the second feature.

It should be noted that when an element is described as being "fixed to" or "arranged on" another element, it may be directly on another element or there may be an intermediate element. When an element is considered to be "connected" to another element, it may be directly connected to another element or there may be an intermediate element. The terms "vertical", "horizontal", "upper", "lower", "left", "right" and similar expressions used herein are for the purpose of illustration only, and are not meant to be the only implementation way.

Figure 2:
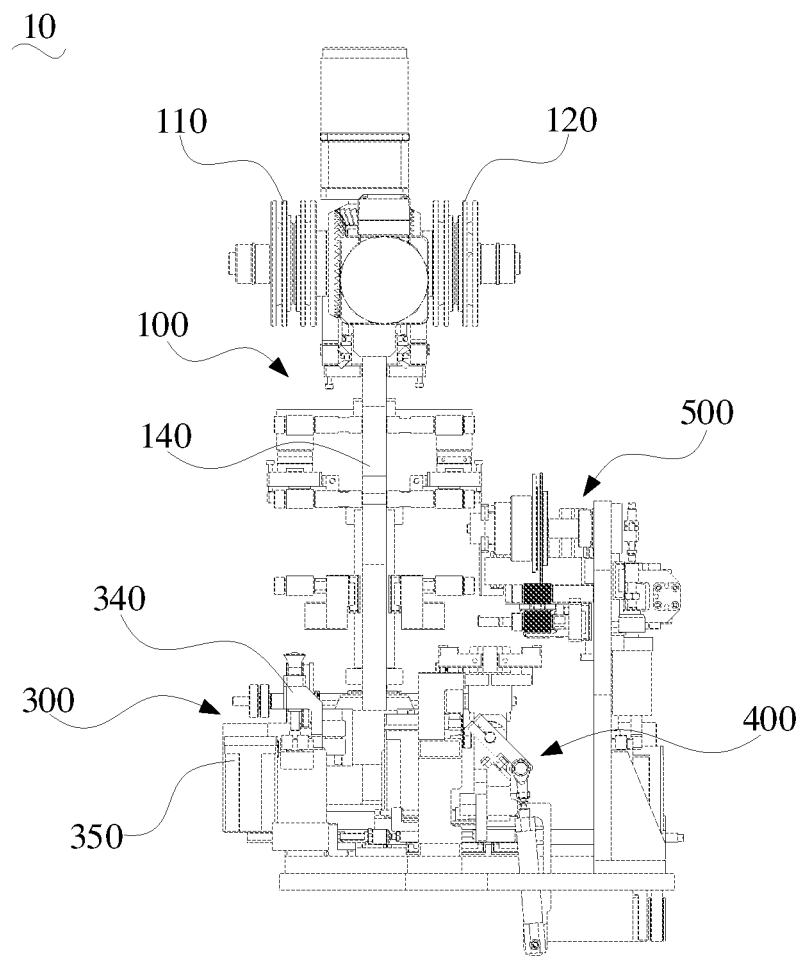
FIG. 2 is a right view of the coil replacing device shown in FIG. 1.
Figure 3:
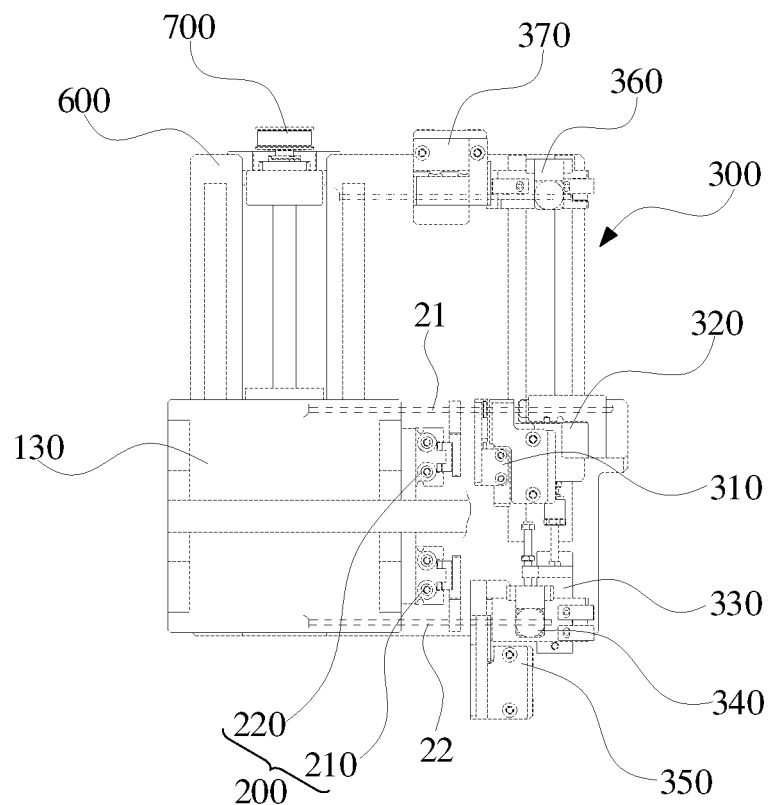
FIG. 3 is a partial top view of the coil replacing device shown in FIG. 1 without an unreeling mechanism.

Referring to FIGS. 1-3, a coil replacing device 10 in one embodiment of the application comprises an unreeling mechanism 100, a fixing mechanism 200, a tape connecting mechanism 300 and an adhesive attaching mechanism 400.

The unreeling mechanism 100 comprises a first unreeling assembly 110 and a second unreeling assembly 120. The first unreeling assembly 110 and the second unreeling assembly 120 have the same structure, and may each comprise an unreeling shaft which is used for mounting reels and unreeling and outputting material tapes downstream. The material tape may be tab tapes, electrode plate tapes and other material tapes that need to be unreeled in the production process, and the material tape in this embodiment refers to tab tape.

Generally, a tension adjusting assembly (not shown) and a plurality of passing rollers (not shown) are further arranged downstream of the first unreeling assembly 110 and the second unreeling assembly 120. The tension adjusting assembly is used to buffer or release the material tape during unreeling, so as to maintain the tension of the material tape, and the passing rollers can change the conveying direction of the material tape. In this embodiment, the material tapes unreeled by the first unreeling assembly 110 and the second unreeling assembly 120 can be conveyed in a generally horizontal direction after being guided by the plurality of passing rollers, and a surface of the material tape is generally parallel to the horizontal plane.

The material tapes unreeled by the first unreeling assembly 110 and the second unreeling assembly 120 can be alternately used as a working material tape 21 and a spare material tape 22. That is, when the material tape unreeled by the first unreeling assembly 110 is used as the working material tape 21, the material tape unreeled by the second unreeling assembly 120 is used as the spare material tape 22; and when the material tape unreeled by the first unreeling assembly 110 is used as the spare material tape 22, the material tape unreeled by the second unreeling assembly 120 is used as the working material tape 21. The working material tape 21 refers to a material tape which is conveyed downstream after being unreeled by the unreeling mechanism 100, and finally cut and processed into pieces (e.g., tab pieces), and the spare material tape 22 is not conveyed downstream and processed for the time being, but only serves as a supplement after the unreeling of the working material tape 21 being completed.

The fixing mechanism 200 comprises a first fixing assembly 210 and a second fixing assembly 220. The fixing mechanism 200 is located downstream of the unreeling mechanism 100, and the first fixing assembly 210 and the second fixing assembly 220 can fix the material tapes unreeled and output by the first unreeling assembly 110 and the second unreeling assembly 120 respectively. The fixing mechanism 200 can fix the material tape by adsorption, clamping, etc. In this embodiment, the first fixing assembly 210 comprises a clamping jaw cylinder and two fixing jaws fixed to a driving end of the clamping jaw cylinder, and the clamping jaw cylinder can drive the two fixing jaws to close or open, so as to clamp or release the material tape unreeled by the first unreeling assembly 110. The structure of the second fixing assembly 220 is the same as that of the first fixing assembly 210, so it will not be described again.

The tape connecting mechanism 300 comprises a first cutting assembly 310 and a first positioning assembly 320. The tape connecting mechanism 300 is located downstream of the fixing mechanism 200, and the working material tape 21 unreeled and output by the unreeling mechanism 100 can pass through the fixing mechanism 200 and the first positioning assembly 320 in sequence. The first cutting assembly 310 can cut off the working material tape 21 fixed by the fixing mechanism 200 (which may be the first fixing assembly 210 or the second fixing assembly 220) and the first positioning assembly 320. Specifically, the first cutting assembly 310 generally cuts off the working material tape 21 through the cooperation of upper and lower cutters, and the first positioning assembly 320 can also fix the working material tape 21 by clamping, adsorbing, etc. The working material tape 21 is fixed by the first positioning assembly 320 after being cut off.

Further, the unreeling mechanism 100 and the fixing mechanism 200 can reciprocate in a first direction relative to the first positioning assembly 320, so that the spare material tape 22 fixed by the fixing mechanism 200 (which may be the first fixing assembly 210 or the second fixing assembly 220) is aligned with the working material tape 21 fixed by the first positioning assembly 320. The first direction refers to a direction in which the two material tapes unreeled by the first unreeling assembly 110 and the second unreeling assembly 120 are spaced apart, that is, the up-down direction shown in FIG. 3 or the left-right direction shown in FIG. 2.

The fixing mechanism 200 passes by a first position and a second position in the process of reciprocating in the first direction. As shown in FIG. 3, when the material tape unreeled by the second unreeling assembly 120 is used as the working material tape 21, the fixing mechanism 200 is located at the first position, the second fixing assembly 220 is aligned with the first positioning assembly 320, and the working material tape 21 unreeled by the second unreeling assembly 120 sequentially passes through the second fixing assembly 220, the first cutting assembly 310 and the first positioning assembly 320 until it is conveyed downstream to a cutting station to be cut into pieces.

Figure 10:
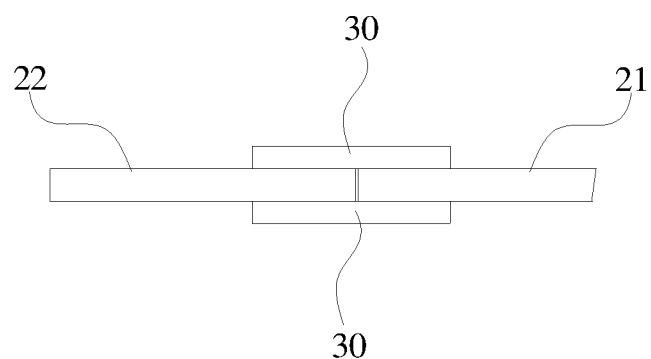
FIG. 10 is a structural diagram showing the connection between a spare material tape and a working material tape in one embodiment of this application.

In this case, the material tape on the first unreeling assembly 110 is the spare material tape 22. When unreeling of the material tape on the second unreeling assembly 120 is about to be finished, the second fixing assembly 220 and the first positioning assembly 320 will fix the working material tape 21 at the same time, and the first cutting assembly 310 will cut off the fixed working material tape 21, thus obtaining the working material tape 21 fixed on the first positioning assembly 320. Then, the unreeling mechanism 100 and the fixing mechanism 200 are moved to the second position in the first direction (the top shown in FIG. 3), so that the first fixing assembly 210 is aligned with the first positioning assembly 320. At this point, the spare material tape 22 unreeled by the first unreeling assembly 110 is aligned with the working material tape 21 fixed by the first positioning assembly 320. An adhesive attaching mechanism 400 attaches adhesive pieces 30 (as shown in FIG. 10) to at least a side (usually both sides) of the aligned spare material tape 22 and working material tape 21, and part of the adhesive piece 30 is bonded to a starting end of the spare material tape 22 and the other part is bonded to a cut end of the working material tape 21, so that the spare material tape 22 unreeled by the first unreeling assembly 110 can be connected with the original working material tape 21 to form a new working material tape 21. Then, the first fixing assembly 210 and the first positioning assembly 320 respectively release the fixed material tapes, and the first unreeling assembly 110 can unreel and output the working material tape 21 downstream. When the first unreeling assembly 110 unreels and outputs the working material tape 21, a new reel can be loaded onto the second unreeling assembly 120 to serve as the spare material tape 22.

Figure 4:
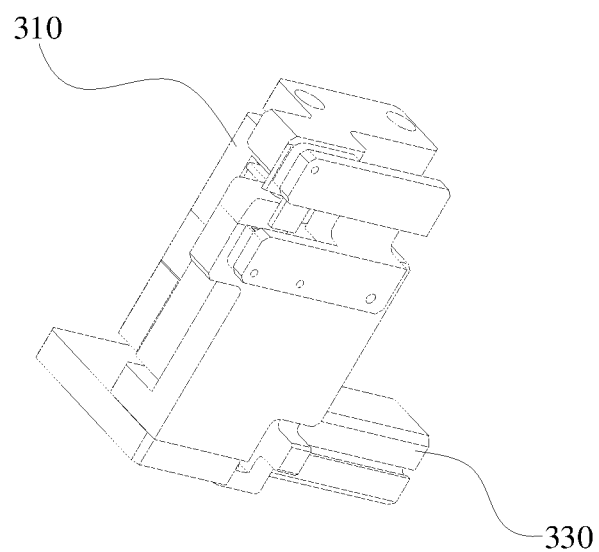
FIG. 4 is a diagram of the connection relationship between a receding driver and a first cutting assembly in the coil replacing device shown in FIG. 1.

Referring to FIG. 4, specifically in this embodiment, the tape connecting mechanism 300 further comprises a first driver 330 which is connected with the first cutting assembly 310 in a driving mode and able to drive the first cutting assembly 310 to move close to or away from the material tape between the first positioning assembly 320 and the fixing mechanism 200.

In order to ensure a more orderly working process of the coil replacing device 10, the first driver 330 drives the first cutting assembly 310 to move in the same direction as the fixing mechanism 200, which is the first direction. After the working material tape 21 fixed by the fixing mechanism 200 and the first positioning assembly 320 is cut off, the first cutting assembly 310 can be driven by the first driver 330 to move away from the working material tape 21, thus exposing the cut end of the working material tape 21 and avoiding the adhesive attaching track of the adhesive attaching mechanism 400, so as to prevent the situation that the adhesive attaching mechanism 400 cannot attach the adhesive pieces 30 to the spare material tape 22 and the working material tape 21 smoothly due to the blocking of the first cutting assembly 310.

It should be noted that in the normal working state, the material tapes between the first positioning assembly 320 and the fixing mechanism 200 are the working material tape 21, and in the coil replacing process, the material tapes between the first positioning assembly 320 and the fixing mechanism 200 include both the working material tape 21 and the spare material tape 22.

Similarly, when unreeling of the material tape on the first unreeling assembly 110 is about to be finished as the working material tape 21, the first fixing assembly 210 and the first positioning assembly 320 fix the current working material tape 21 at the same time, and then the fixed working material tape 21 is cut off by the first cutting assembly 310. Then, the unreeling mechanism 100 and the fixing mechanism 200 are moved to the first position in the first direction (the bottom shown in FIG. 3) relative to the first positioning assembly 320, so that the second fixing assembly 220 is aligned with the first positioning assembly 320. At this point, the spare material tape 22 unreeled by the second unreeling assembly 120 is aligned with the working material tape 21 fixed by the first positioning assembly 320. The adhesive attaching mechanism 400 attaches the adhesive pieces 30 to at least a side of the aligned spare material tape 22 and working material tape 21, so that the spare material tape 22 unreeled by the second unreeling assembly 120 can be connected with the original working material tape 21 to form a new working material tape 21. Then, the second fixing assembly 220 and the first positioning assembly 320 respectively release the fixed material tapes, and the second unreeling assembly 120 can unreel and output the working material tape 21 downstream. When the second unreeling assembly 120 unreels and outputs the working material tape 21, a new reel can be loaded onto the first unreeling assembly 110 as the spare material tape 22.

In this way, the first unreeling assembly 110 and the second unreeling assembly 120 alternately unreel the working material tape 21, and automatic coil replacing is realized after the working material tape 21 is completely unreeled. In the coil replacing process, the first positioning assembly 320 keeps the original working material tape 21 fixed, and the fixing mechanism 200 keeps the spare material tape 22 fixed, thus ensuring reliable alignment between the working material tape 21 and the spare material tape 22.

In this embodiment, the fixing mechanism 200 is fixedly connected with the unreeling mechanism 100, so that the first unreeling assembly 110 and the second unreeling assembly 120 can move in the first direction synchronously with the fixing mechanism 200. In this way, the relative positions between the first unreeling assembly 110 and the second unreeling assembly 120 and the first fixing assembly 210 and the second fixing assembly 220 can remain unchanged. In the coil replacing process, when the unreeling mechanism 100 and the fixing mechanism 200 reciprocate in the first direction, synchronism is better.

Referring to FIGS. 1 and 2 again, in this embodiment, the coil replacing device 10 further comprises a base plate 600 and a transmission mechanism 700. And, the unreeling mechanism 100 further comprises a moving plate 130 slidably mounted on the base plate 600 in the first direction, and the first unreeling assembly 110, the second unreeling assembly 120 and the fixing mechanism 200 are all mounted on the moving plate 130.

The transmission mechanism 700 may be an air cylinder, an electric cylinder or a motor (used in conjunction with a screw pair), etc. The transmission mechanism 700 can drive the moving plate 130 to slide in the first direction, so as to drive the fixing mechanism 200 to move between the first position and the second position. It can be seen that when the transmission mechanism 700 drives the fixing mechanism 200 to move in the first direction, the first unreeling assembly 110 and the second unreeling assembly 120 will also move synchronously with the moving plate 130 in the first direction.

The base plate 600 can be fixedly connected with a large plate of other equipment, such as a winder, and the tape connecting mechanism 300 may also be mounted on the base plate 600. In this embodiment, the unreeling mechanism 100 further comprises a vertical plate 140 which is mounted on the moving plate 130 and extends in a direction perpendicular to a surface of the base plate 600, and the first unreeling assembly 110 and the second unreeling assembly 120 are both arranged on the vertical plate 140. It can be seen that the unreeling mechanism 100 can reasonably utilize the space above the base plate 600, thus making the structure of the coil replacing device 100 more compact.

In addition, the unreeling mechanism 100 is arranged at an end of the base plate 600 in the second direction, which is perpendicular to the first direction, that is, the left-right direction shown in FIG. 1. The tape connecting mechanism 300 and the unreeling mechanism 100 are spaced apart in the second direction, and the adhesive attaching mechanism 400 and the tape connecting mechanism 300 are spaced apart in the first direction. Therefore, the space above the base plate 600 can be fully utilized, thus making the structure of the coil replacing device 100 more compact.

Referring to FIG. 3 again, in this embodiment, the tape connecting mechanism 300 further comprises a second positioning assembly 340 and a second cutting assembly 350. The second positioning assembly 340 is located on a side of the first positioning assembly 320 in the first direction and is spaced from the first positioning assembly 320, and the second cutting assembly 350 is located upstream (the left side in FIG. 2) of the second positioning assembly 340.

When the fixing mechanism 200 passes by the first position, the second fixing assembly 220 is aligned with the first positioning assembly 320, and the first fixing assembly 210 will also be aligned with the second positioning assembly 340. At this point, the spare material tape 22 unreeled by the first unreeling assembly 110 passes through the second cutting assembly 350 and the second positioning assembly 340 in sequence, and the second cutting assembly 350 can cut off the spare material tape 22 fixed by the first fixing assembly 210 and the second positioning assembly 340.

It can be seen that before coil replacing, the spare material tape 22 unreeled by the first unreeling assembly 110 will also be cut off, thus forming the spare material tape 22 fixed to the first fixing assembly 210. In this way, the length of the spare material tape 22 stretching out the first fixing assembly 210 can be accurately controlled. When the fixing mechanism 200 moves to the second position to prepare for coil replacing and the first fixing assembly 210 is aligned with the first positioning assembly 320, the spare material tape 22 fixed by the first fixing assembly 210 can better match the working material tape 21 fixed by the first positioning assembly 320, that is, the starting end of the spare material tape 22 is coplanar with the cut end of the working material tape 21, which allows the adhesive attaching mechanism 400 to smoothly attach the adhesive pieces 30.

In addition, the tape connecting mechanism 300 further comprises a third positioning assembly 360 and a third cutting assembly 370, the third positioning assembly 360 is located on a side, facing away from the second positioning assembly 340, of the first positioning assembly 320 and is spaced from the first positioning assembly 320, and the third cutting assembly 370 is located upstream of the third positioning assembly 360. That is, the third positioning assembly 360 and the second positioning assembly 340 are located on two sides of the first positioning assembly 320 respectively in the first direction, i.e., the upper and lower sides as shown in FIG. 3.

When the fixing mechanism 200 passes by the second position, the first fixing assembly 210 will be aligned with the first positioning assembly 320, and the second fixing assembly 220 will also be aligned with the third positioning assembly 360. At this point, the spare material tape 22 unreeled by the second unreeling assembly 120 passes through the third cutting assembly 370 and the third positioning assembly 360 in sequence, and the third cutting assembly 370 can cut off the spare material tape 22 fixed by the second fixing assembly 220 and the third positioning assembly 360.

Similarly, before coil replacing, the spare material tape 22 unreeled by the second unreeling assembly 120 will also be cut off, thus forming the spare material tape 22 fixed to the second fixing assembly 220. In this way, the length of the spare material tape 22 stretching out the second fixing assembly 220 can be consistent with the length of the spare material tape 22 stretching out the first fixing assembly 210. When the fixing mechanism 200 moves to the first position to prepare for coil replacing and the second fixing assembly 220 is aligned with the first positioning assembly 320, the spare material tape 22 fixed by the second fixing assembly 220 can better match the working material tape 21 fixed by the first positioning assembly 320, which allows the adhesive attaching mechanism 400 to smoothly attach the adhesive pieces 30.

Figure 5:
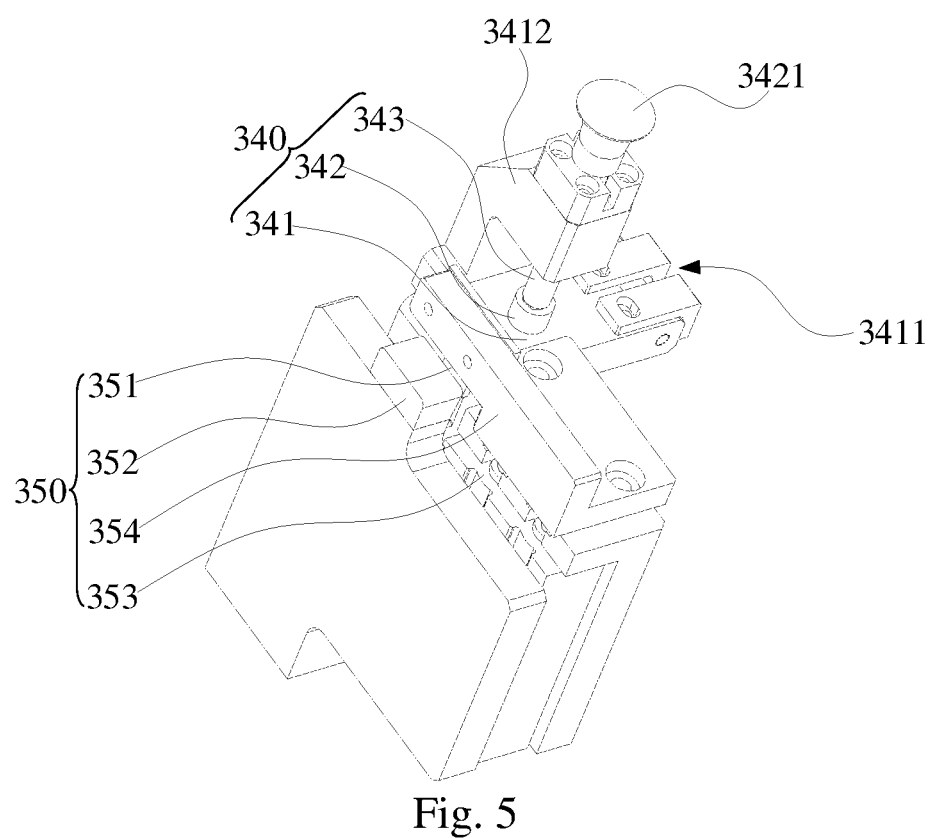
FIG. 5 is a structural diagram of a second cutting assembly and a second positioning assembly in the coil replacing device shown in FIG. 1.

Referring to FIG. 5, in this embodiment, the second cutting assembly 350 comprises an upper cutter 351, a lower cutter 352 and a cutting driver 353. The spare material tape 22 unreeled by the first unreeling assembly 110 is supported by the lower cutter 352 when passing through the second cutting assembly 350, and the lower cutter 352 is located on a side, facing away from the second positioning assembly 340, of the upper cutter 351.

Specifically, the upper cutter 351 is opposite to the lower cutter 352, and the spare material tape 22 drawn to the second positioning assembly 350 passes between the upper cutter 351 and the lower cutter 352. The upper cutter 351 can be connected with a driving end of the cutting driver 353 through a connecting base 354, and the cutting driver 353 is generally an air cylinder, which drives the upper cutter 351 to move relative to the lower cutter 352 to cut off the spare material tape 22 supported by the lower cutter 352.

Further, since the lower cutter 352 is located on the side, facing away from the second positioning assembly 340, of the upper cutter 351, that is, the lower cutter 352 is located upstream of the upper cutter 351 (the right side in FIG. 3), when the spare material tape 22 is cut off, a supporting surface (upper surface) of the lower cutter 352 can support the starting end of the spare material tape 22, thereby preventing the starting end of the spare material tape 22 from being tilted.

Further, in this embodiment, the second positioning assembly 340 comprises a supporting plate 341, a pressing rod 342 and an elastic member 343, and the pressing rod 342 is able to press the spare material tape 22 on a supporting surface of the supporting plate 341 under an action of the elastic member 343. Further, the lower cutter 352 is fixedly connected with the supporting plate 341, and the supporting surface of the lower cutter 352 is flush with the supporting surface of the supporting plate 341.

When the first fixing assembly 210 is aligned with the second positioning assembly 340, the spare material tape 22 unreeled by the first unreeling assembly 110 can be manually pulled to the second positioning assembly 340 and fixed, so that both the first fixing assembly 210 and the second positioning assembly 340 can fix the spare material tape 22. The supporting plate 341 can support the spare material tape 22. When pulling the spare material tape 22, the pressing rod 342 can be lifted manually to keep the pressing rod 342 away from the supporting plate 341. After the spare material tape 22 passes under the pressing rod 342, the pressing rod 342 can be released to abut against the supporting surface of the supporting plate 341 under the action of the elastic member 343, so as to press the spare material tape 22.

Since the lower cutter 352 can be fixedly mounted on the supporting plate 341, that is, the second cutting assembly 350 and the second positioning assembly 340 can share the supporting plate 341, the structure of the tape connecting mechanism 300 can be simplified to some extent, thus making the structure of the coil replacing device 10 more compact. When the spare material tape 22 is cut off, both the supporting surface of the supporting plate 341 and the supporting surface of the lower cutter 352 can support the spare material tape 22 and keep it still, so that the starting end of the spare material tape 22 can be prevented from being tilted after cutting off.

Specifically, an edge of the supporting plate 341 is provided with a bent base 3412, an end of the bent base 3412 extends above the supporting surface of the supporting plate 341, and the pressing rod 342 slidably penetrates through the bent base 3412. The elastic member 343 is a compression spring which is disposed around the pressing rod 342, and two ends of the compression spring abut against the bent base 3412 and the head of the pressing rod 342 (the end facing the surface of the supporting plate 341) respectively, so as to provide a downward force for the pressing rod 342. In addition, to facilitate manual lifting of the pressing rod 342, a handle 3421 is provided at an end, away from the supporting surface of the supporting plate 341, of the pressing rod 342.

Further, in this embodiment, a guide groove 3411 for the spare material tape 22 to pass through is formed in the surface of the supporting plate 341. The guide groove 3411 can guide and limit the spare material tape 22, thus facilitating accurate pulling of the spare material tape 22. Specifically, the supporting plate 341 is provided with two guide blocks (not shown) which are arranged opposite to each other, thus forming the guide groove 3411. Obviously, in other embodiments, the guide groove 3411 can also be integrally formed with the supporting plate 341.

It should be noted that the structures and functions of the third positioning assembly 360 and the third cutting assembly 370 are roughly the same as those of the second positioning assembly 340 and the second cutting assembly 350, so the details will not be repeated here.

Figure 6:
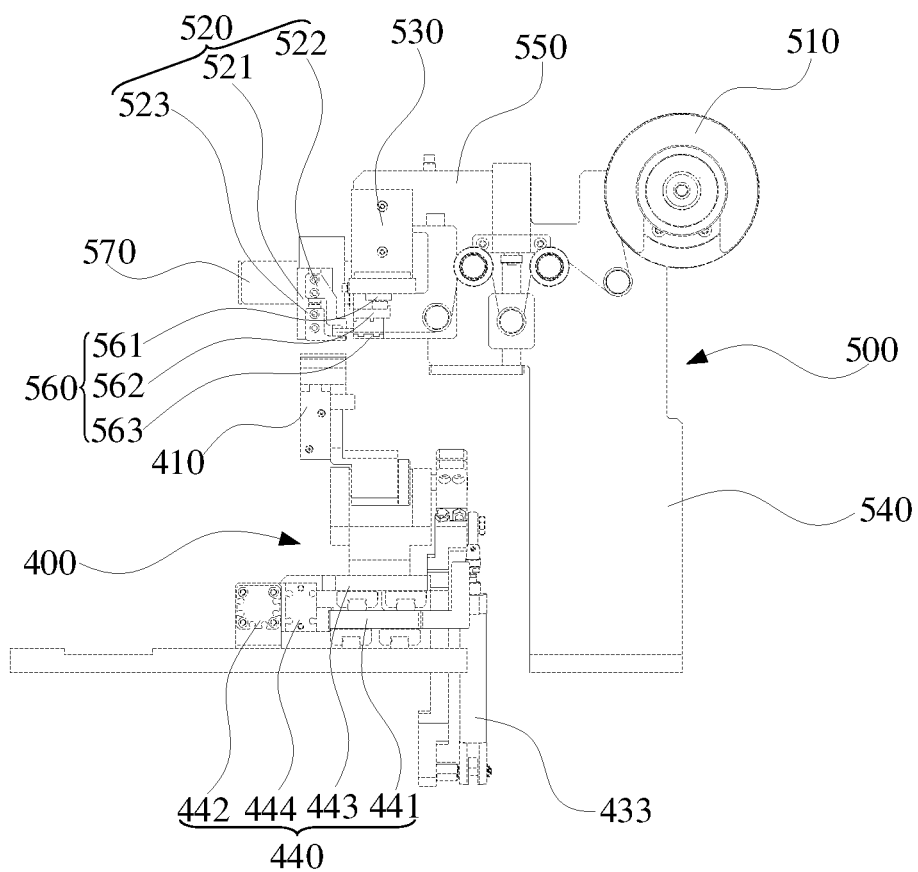
FIG. 6 is a front view of an adhesive preparation mechanism and an adhesive attaching mechanism in the coil replacing device shown in FIG. 1.
Figure 7:
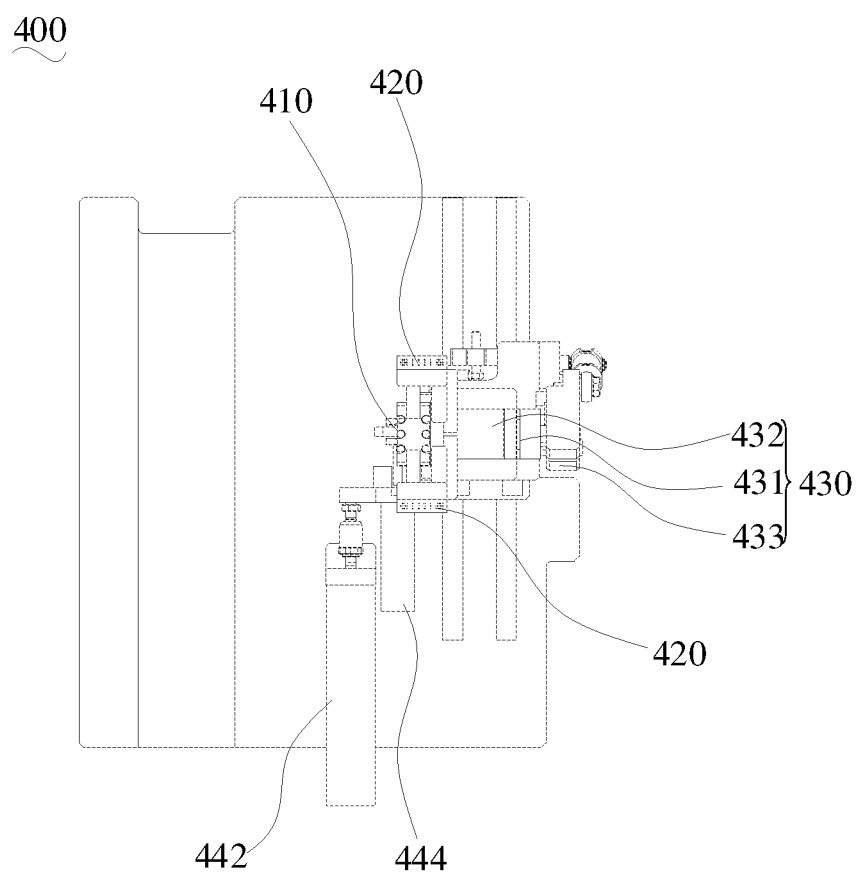
FIG. 7 is a top view of the adhesive attaching mechanism shown in FIG. 6.
Figure 8:
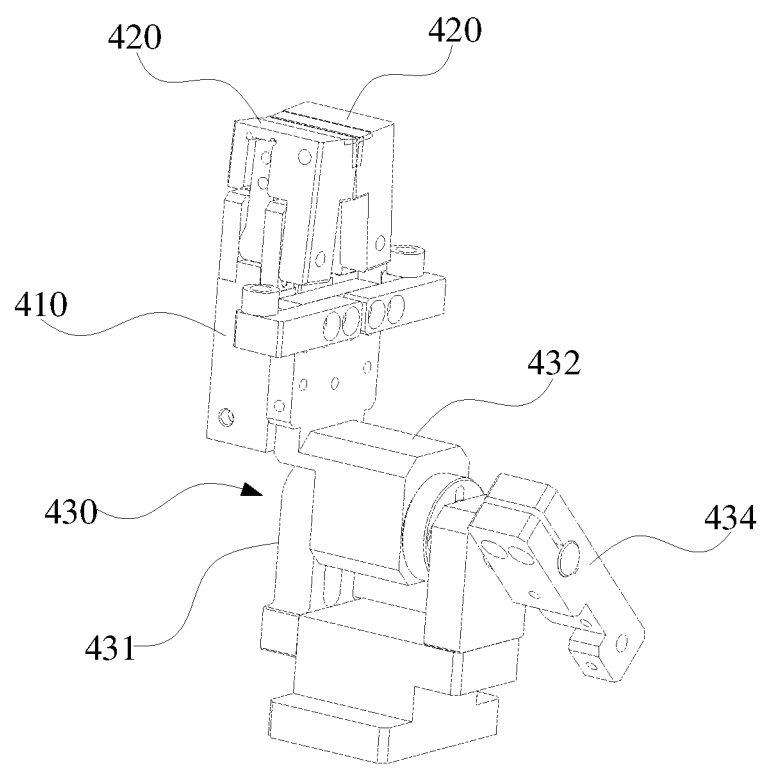
FIG. 8 is a partial isometric view of the adhesive attaching mechanism shown in FIG. 6 without a transfer assembly.

Referring to FIGS. 6-8, the adhesive attaching mechanism 400 may be mounted on the base plate 600, and the adhesive attaching mechanism 400 comprises an adhesive attaching driver 410, suction plates 420 and a swing assembly 430. Two suction plates 420 are mounted at a driving end of the adhesive attaching driver 410, and can be folded or unfolded under the driving of the adhesive attaching driver 410.

The adhesive attaching driver 410 may be a clamping jaw cylinder, and the two suction plates 420 are respectively mounted on two jaws of the clamping jaw cylinder. The suction plate 420 has a suction surface, which can suck the adhesive piece 30 by negative pressure, electrostatic adsorption, etc. When the two suction plates 420 are unfolded under the driving of the adhesive attaching driver 410, the suction surfaces of the two suction plates 420 move away from each other to be coplanar or approximately coplanar. When the two suction plates 420 are folded under the driving of the adhesive attaching driver 410, the suction surfaces of the two suction plates 420 move closer to each other until they make contact or almost make contact.

Further, the swing assembly 430 can drive the adhesive attaching driver 410 to swing between the adhesive preparation position and the adhesive attaching position. Specifically, an end, away from the suction plates 420, of the adhesive attaching driver 410 can rotate around a rotating shaft, so that the adhesive attaching driver 410 can swing. The rotating shaft of the adhesive attaching driver 410 is generally perpendicular to the first direction, and can extend in the left-right direction as shown in FIG. 6. Compared with the adhesive attaching position, the adhesive preparation position is farther from the material tape between the fixing mechanism 200 and the first positioning assembly 320. At the adhesive preparation position, the adhesive pieces 30 for connecting the spare material tape 22 with the working material tape 21 can be loaded onto at least one of the suction plates 420. At the adhesive attaching position, the adhesive attaching driver 410 can drive the suction plates 420 to attach the sucked adhesive pieces 30 to the surfaces of the spare material tape 22 and the working material tape 21 which are aligned.

Specifically, when the swing assembly 430 drives the adhesive attaching driver 410 to swing to the adhesive preparation position, the adhesive attaching driver 410 can drive the two suction plates 420 to be unfolded. At this point, the suction surfaces of the two suction plates 420 face upwards and are roughly horizontal, so that the adhesive pieces 30 stored in advance or prepared in real time by other mechanisms can be successfully received and sucked by the suction surfaces of the suction plates 420.

After the adhesive pieces 30 on the suction plates 420 are loaded, the two suction plates 420 remain unfolded, and the swing assembly 430 drives the adhesive attaching driver 410 to swing to the adhesive attaching position. At this point, the two suction plates 420 are located on the upper side and the lower side of the aligned spare material tape 22 and working material tape 21 respectively. When swinging from the adhesive preparation position to the adhesive attaching position, the adhesive attaching driver 410 needs to swing by about 90 degrees, so the suction surfaces of the two suction plates 420 will be switched from horizontal to roughly vertical, and one suction plate 420 is located above the aligned spare material tape 22 and working material tape 21, while the other suction plate 420 is located below the aligned spare material tape 22 and working material tape 21.

Then, the adhesive attaching driver 410 drives the two suction plates 420 to be folded, and the suction surfaces of the two suction plates 420 move close to each other until the cut end of the working material tape 21 and the starting end of the spare material tape 22 are clamped between the two suction plates 420. At this point, the adhesive pieces 30 on the suction surfaces of the suction plates 420 can be bonded with the starting end of the spare material tape 22 and the cut end of the working material tape 21, thereby connecting the spare material tape 22 with the working material tape 21.

After adhesive attachment is completed, the two suction plates 420 will be unfolded again under the driving of the adhesive attaching driver 410, and will be driven by the swing assembly 430 to return to the adhesive preparation position to prepare for the next round of adhesive attachment.

It can be seen that the adhesive attaching mechanism 400 can quickly realize automatic adhesive attachment, thus further improving the coil replacing efficiency of the coil replacing device 10. In addition, when switching between the adhesive preparation position and the adhesive attaching position, the adhesive attaching mechanism 400 only needs to swing around the rotating shaft, and there is no need to arrange linear driving assemblies in multiple directions, so that the structure of the adhesive attaching mechanism 400 can be simplified.

In this embodiment, the swing assembly 430 comprises a support 431, a swing base 432 and a swing driver 433, the swing base 432 is rotatably mounted on the support 431, the adhesive attaching driver 410 is fixedly mounted on the swing base 432, and the swing driver 433 is able to drive the swing base 432 to rotate, so that the swing base 432 drives the adhesive attaching driver 410 to swing between the adhesive preparation position and the adhesive attaching position.

A U-shaped mounting part (not shown) is formed on the support 431, and the swing base 432 can be rotatably mounted in the U-shaped mounting part of the support 431 through a pin shaft (not shown), thus ensuring stability in the rotating process. The swing base 432 can provide a large mounting area for the adhesive attaching driver 410. Specifically, the swing assembly 430 further comprises a connecting rod 434, an end of the connecting rod 434 is fixedly connected with the pin shaft, and another end of the connecting rod 434 is hinged to a moving end of the swing driver 433. Further, the moving end of the swing driver 433 can be controlled to stretch out and draw back, and drive the pin shaft to rotate through the connecting rod 434, thereby driving the swing base 432 to rotate. The swing driver 433 may be an air cylinder, a fixed end of which can be hinged to a second slide plate 443 of a transfer assembly 440 (see FIGS. 6 and 7).

Referring to FIGS. 1 and 6 again, in this embodiment, the coil replacing device 10 further comprises an adhesive preparation mechanism 500 which is able to cut unreeled adhesive tape into adhesive pieces 30 and transport the adhesive pieces 30 to the surfaces of the suction plates 420 located at the adhesive preparation position.

The adhesive preparation mechanism 500 can also be mounted on the base plate 600. The adhesive preparation mechanism 500 can prepare the adhesive pieces 30 in real time by using adhesive tape, so that the coil replacing device 10 can realize integrated operation of adhesive preparation and attachment, and manual operation can be further reduced. In addition, the adhesive pieces 30 prepared by the adhesive preparation mechanism 500 can be directly transferred to the surfaces of the suction plates 420 without the need for storage, so the problem that the surfaces of the adhesive pieces 30 are contaminated during storage can be avoided.

Figure 9:
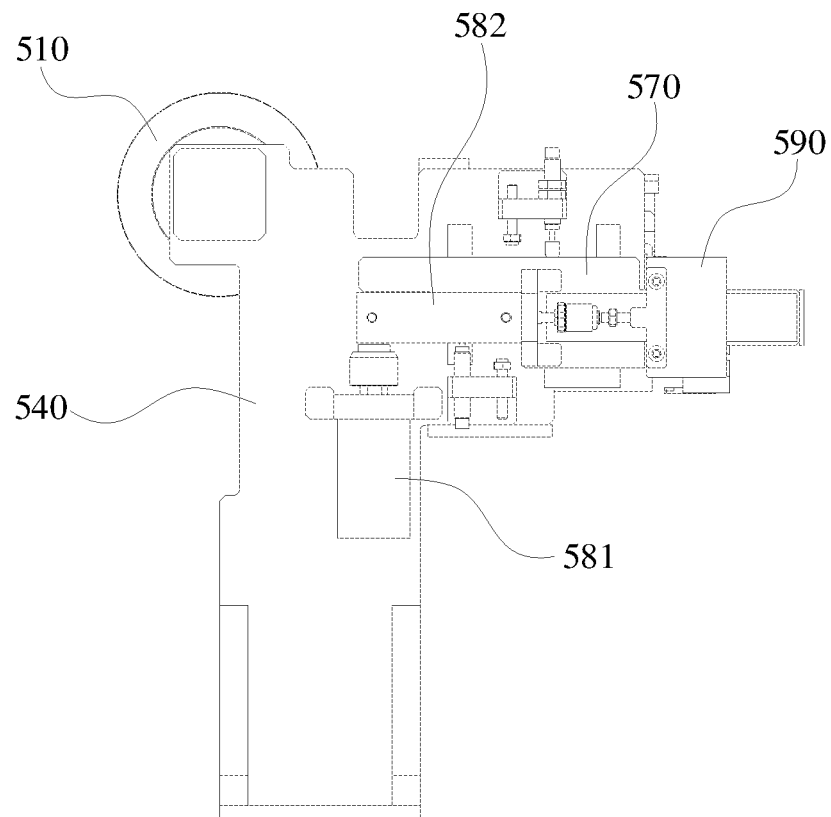
FIG. 9 is a rear view of the adhesive preparation mechanism shown in FIG. 6.

Referring to FIG. 9, in this embodiment, the adhesive preparation mechanism 500 comprises an adhesive tape unreeling assembly 510, a pulling assembly 520 and a cutting assembly 530.

The adhesive tape unreeling assembly 510 may comprise an unreeling shaft, and the adhesive tape unreeling assembly 510 is used for unreeling adhesive tape. Generally, a tension adjusting assembly (not shown) and passing rollers (not shown) are further arranged downstream of the adhesive tape unreeling assembly 510. The tension adjusting assembly can maintain the tension of the adhesive tape. The pulling assembly 520 is used to pull a preset length of adhesive tape above the suction plates 420, and the cutting assembly 530 is used to cut off the adhesive tape between the pulling assembly 520 and the adhesive tape unreeling assembly 510 to obtain the adhesive pieces 30 carried by the suction plates 420.

It can be seen that the adhesive pieces 30 obtained from each cutting by the cutting assembly 530 can be directly received by the suction plates 420, thus speeding up the loading of the adhesive pieces 30 and avoiding the contamination of the adhesive pieces 30.

In addition, the adhesive preparation mechanism 500 also comprises a supporting base 540 playing a supporting role, and the adhesive tape unreeling assembly 510, the pulling assembly 520 and the cutting assembly 530 are all mounted on the supporting base 540. The supporting base 540 can vertically extend along a surface of the base 600, so that the space above the base 600 can be reasonably utilized, and the structure of the coil replacing device 10 is more compact.

In addition, the adhesive preparation mechanism 500 further comprises a depressing assembly 560 which is able to fix the adhesive tape between the pulling assembly 520 and the adhesive tape unreeling assembly 510 and drive the fixed adhesive tape to move toward the suction plates 420 (the bottom in FIG. 6) until the adhesive tape above the suction plates 420 is sucked by the suction plates 420. That is, the adhesive pieces 30 are sucked by the suction plates 420 before being cut off from the adhesive tape, so the adhesive pieces 30 obtained after the cutting assembly 530 cuts off the adhesive tape will be directly fixed on the suction surfaces of the suction plates 420, thus omitting the process of transferring the sheet-like adhesive pieces 30 from an output end of the adhesive preparation mechanism 500 to the suction plates 420, and avoiding the contamination, warping or deflection of the adhesive pieces 30 during the transfer process.

Specifically, in this embodiment, a connecting plate 550 is slidably connected with the supporting base 540 in a vertical direction, and the cutting assembly 530 and the depressing assembly 560 are both mounted on the connecting plate 550. In addition, the depressing assembly 560 comprises a pressing cylinder 561, a first clamping jaw 562 and a second clamping jaw 563, the first clamping jaw 562 is fixed to a moving end of the pressing cylinder 561, and the second clamping jaw 563 is arranged below the first clamping jaw 562 and fixedly connected with the connecting plate 550.

Further, a second connecting base 570 is slidably connected with a side, facing away from the connecting plate 550, of the supporting base 540 in the vertical direction, and the second connecting base 570 is fixedly connected with the connecting plate 550 through a connecting block (not shown). The supporting base 540 is provided with a first cylinder 581, and a moving end of the first cylinder 581 is fixedly connected with the second connecting base 570. A moving base 590 is slidably connected with the second connecting base 570 in the horizontal direction, the second connecting base 570 is provided with a second cylinder 582, and a moving end of the second cylinder 582 is fixedly connected with the moving base 590.

The pulling assembly 520 comprises a pulling cylinder 521, and the pulling cylinder 521 is fixedly arranged on the moving base 590. Two moving ends of the pulling cylinder 521 are fixedly connected with a third clamping jaw 522 and a fourth clamping jaw 523 respectively. When pulling the adhesive tape, the third clamping jaw 522 and the fourth clamping jaw 523 clamp the adhesive tape and are driven by the second cylinder 582 to move horizontally with the moving base 590 to pull a preset length of adhesive tape. Then, the first clamping jaw 562 is driven by the pressing cylinder 561 to cooperate with the second clamping jaw 563 to clamp the adhesive tape, and the first cylinder 581 drives the connecting plate 550 to descend, thus driving the depressing assembly 560 to drive the clamped adhesive tape downward until the adhesive tape pulled by the pulling assembly 520 is sucked by the suction surfaces of the suction plates 420. Finally, the cutting assembly 530 cuts off the adhesive tape to obtain the adhesive pieces 30 sucked by the suction plates 420.

Referring to FIGS. 6 and 7 again, in this embodiment, the adhesive attaching mechanism 400 further comprises a transfer assembly 440 which can drive the adhesive attaching driver 410 to move in the first direction when the adhesive attaching driver 410 is located at the adhesive preparation position, so that the two suction plates 420 sequentially pass through a position for receiving the adhesive pieces 30 output by the adhesive preparation mechanism 500.

Because the distance between the two suction plates 420 is large, and the position where the adhesive pieces 30 are output from the adhesive preparation mechanism 500 is generally constant, the adhesive pieces 30 cannot be conveyed to the surfaces of the two suction plates 420 at the same time. In this embodiment, the position for receiving the adhesive pieces 30 output by the adhesive preparation mechanism 500 refers to the direction of the output end of the adhesive preparation mechanism 500. After the transfer assembly 440 is arranged, one of the suction plates 420 can receive the adhesive pieces 30 output by the adhesive preparation mechanism 500. Then, the transfer assembly 440 drives the adhesive attaching driver 410 to move in the first direction for a certain distance (generally, the distance between the two suction plates 420), so that the other suction plate 420 can also enter the position for receiving the adhesive pieces 30 output by the adhesive preparation mechanism 500, and the other suction plate 420 can receive the adhesive pieces 30 output by the adhesive preparation mechanism 500.

It can be understood that the adhesive preparation position includes two positions, namely a first adhesive preparation sub-position and a second adhesive preparation sub-position. As shown in FIG. 7, for example, the adhesive attaching driver 410 entering the adhesive preparation position is located at the first adhesive preparation sub-position, so the upper suction plate 420 first receives the adhesive pieces 30 output by the adhesive preparation mechanism 500; and then, the transfer assembly 440 can drive the adhesive attaching driver 410 to move upward for a certain distance, so that the adhesive attaching driver 410 can move to the second adhesive preparation sub-position, so that the lower suction plate 420 can also receive the adhesive pieces 30 output by the adhesive preparation mechanism 500.

It should be noted that, in other embodiments, the transfer assembly 440 may be omitted, and the output end of the adhesive preparation mechanism 500 may be moved in the first direction, so that the adhesive pieces obtained by cutting 30 are sequentially loaded to the suction surfaces of the two suction plates 420.

Further, in this embodiment, when the adhesive attaching driver 410 is in the adhesive attaching position, the transfer assembly 440 can also drive the adhesive attaching driver 410 to move in the first direction, so that the two suction plates 420 can clamp the aligned spare material tape 22 and working material tape 21 when folded.

In order to prevent the adhesive attaching driver 410 and the suction plates 420 thereon from interfering with the material tape between the first positioning assembly 320 and the fixing mechanism 200 during the swing assembly 430 drives the adhesive attaching driver 410 to swing to the adhesive attaching position, a large space is reserved between the adhesive attaching driver 410 and the material tape to be bonded (the working material tape 21 fixed by the first positioning assembly 320 and the spare material tape 22 fixed by the fixing mechanism 200) before the adhesive attaching driver 410 swings from the adhesive preparing position to the adhesive attaching position. Therefore, after the swing assembly 430 drives the adhesive attaching driver 410 to swing to the adhesive attaching position, the distance between the suction plates 420 and the material tape to be bonded may be too large to realize smooth adhesive attachment. At this point, the transfer assembly 440 can drive the adhesive attaching driver 410 to approach the material tape to be bonded, so as to ensure successful adhesive attachment by the adhesive attaching mechanism 400.

In addition, in this embodiment, the transfer assembly 440 comprises a first transfer structure (not shown) and a second transfer structure (not shown), and the first transfer structure can drive the adhesive attaching driver 410 to move in the first direction, so that the two suction plates 410 can sequentially pass through the position for receiving the adhesive pieces 30 output by the adhesive preparation mechanism 500. The second transfer structure can drive the adhesive attaching driver 410 to move in the first direction towards the material tape between the first positioning assembly 320 and the fixing mechanism 200, so that the two suction plates 420 can clamp the material tape between the first positioning assembly 320 and the fixing mechanism 200 when folded.

That is to say, when at the adhesive preparation position, the adhesive attaching driver 410 can move in the first direction under the driving of the first transfer structure, and when at the adhesive attaching position, the adhesive attaching driver 410 can move in the first direction under the driving of the second transfer structure. Therefore, the adhesive attaching driver 410 will be driven by different transfer structures at different positions, so control is more convenient.

Further, in this embodiment, the first transfer structure comprises a first slide plate 441 and a first transfer cylinder 442, and the second transfer structure comprises a second slide plate 443 and a second transfer cylinder 444.

The first slide plate 441 can slide in the first direction under the driving of the first transfer cylinder 442. Specifically, the first slide plate 441 can be slidably mounted on the base plate 600 in the first direction through a guide rail-slider pair, and the first transfer cylinder 442 is provided on the base plate 600. The second slide plate 443 is slidably mounted on the first slide plate 441 in the first direction, and the second transfer cylinder 444 is mounted on the first slide plate 441 and can drive the second slide plate 443 to slide in the first direction. The adhesive attaching driver 410 is mounted on the second slide plate 443. Specifically, the support 431 of the adhesive attaching mechanism 400 is mounted on the second slide plate 443, so that the adhesive attaching driver 410 and the swing assembly 430 can move in the first direction along with the second slide plate 443 as a whole.

Wherein, the first transfer cylinder 442 can drive the first slide plate 441 to slide in the first direction, so as to drive the two suction plates 420 to sequentially pass through the position for receiving the adhesive pieces 30 output by the adhesive preparation mechanism 500. The second transfer cylinder 444 can drive the second slide plate 443 to slide in the first direction, so that the adhesive attaching driver 410 moves toward the material tape between the first positioning assembly 320 and the fixing mechanism 200 at the adhesive attaching position.

Specifically, the first transfer cylinder 442 and the second transfer cylinder 444 generally have different strokes. The stroke of the first transfer cylinder 442 is generally equal to the distance between the two suction plates 420. The reciprocating movement of the first transfer cylinder 442 can drive the two suction plates 420 to sequentially pass through the position for receiving the adhesive pieces output by the adhesive preparation mechanism 500. It can be seen that after the proper strokes of the first transfer cylinder 442 and the second transfer cylinder 444 are determined, the first transfer cylinder 442 and the second transfer cylinder 444 reciprocate according to a certain rule, so that adhesive preparation and attachment can be smoothly carried out, and control is more convenient.

It should be noted that in other embodiments, the transfer assembly 440 may also adopt other structures. For example, the transfer assembly 440 adopts the structure of a motor and a screw pair matched with the motor, and the rotary motion of the motor is converted into the linear motion of the adhesive attaching driver 410 in the first direction. By controlling the number of rotation cycles of a motor spindle, it is also possible to drive the two suction plates 420 to sequentially pass through the position for receiving the adhesive pieces output by the adhesive preparation mechanism 500, and make the adhesive attaching driver 410 move towards the material tape between the first positioning assembly 320 and the fixing mechanism 200 at the adhesive attaching position.

According to the coil replacing device 10, the first unreeling assembly 110 and the second unreeling assembly 120 can output the working materials tape 21 and the spare materials tape 22 through unreeling. When the unreeling of the working material tape 21 by the first unreeling assembly 110 is about to be finished, the first cutting assembly 310 cuts off the working material tape 21 fixed by both the fixing mechanism 200 and the first positioning assembly 320, and by moving the fixing mechanism 200 relative to the first positioning assembly 320 in the first direction, the spare material tape 22 unreeled by the second unreeling assembly 120 can be aligned with the working material tape 21 fixed by the first positioning assembly 320. Then, the swing assembly 430 drives the adhesive attaching driver 410 to swing from the adhesive preparation position to the adhesive attaching position, and the adhesive attaching mechanism 400 drives the two suction plates 420 to be folded, so that the adhesive pieces 30 can be attached to the aligned spare material tape 22 and working material tape 21, thus connecting the spare material tape 22 with the working material tape 21 to form a new working material tape 21, and a new reel can be loaded onto the first unreeling assembly 110 to serve as a spare material tape 22. In this way, the coil replacing device 10 can realize automatic coil replacing, and coil replacing efficiency is high.

The technical features of the above embodiments can be combined freely. In order to make the description concise, not all possible combinations of the technical features in the above embodiments are described. However, as long as there is no contradiction in the combinations of these technical features, they should be considered as falling in the scope recorded in this specification.

The above embodiments only represent several implementation ways of the application, and their descriptions are specific and detailed, but they cannot be understood as limiting the scope of the patent of the application. It should be pointed out that, for those of ordinary skill in the art, without departing from the concept of the application, several modifications and improvements can be made, which belong to the protection scope of the application. Therefore, the scope of protection of the patent of the application shall be subject to the appended claims.

What is claimed is:

1. A coil replacing device, comprising:
an unreeling mechanism comprising a first unreeling assembly and a second unreeling assembly, material tapes unreeled and output by the first unreeling assembly and the second unreeling assembly alternately used as a working material tape and a spare material tape;
a fixing mechanism arranged downstream of the unreeling mechanism and comprising a first fixing assembly and a second fixing assembly, the first fixing assembly and the second fixing assembly capable of fixing the material tapes unreeled and output by the first unreeling assembly and the second unreeling assembly, respectively;
a tape connecting mechanism arranged downstream of the fixing mechanism and comprising a first cutting assembly and a first positioning assembly, the working material tape unreeled and output by the unreeling mechanism capable of passing through the fixing mechanism and the first positioning assembly in sequence, the first cutting assembly capable of cutting off the working material tape fixed by both the fixing mechanism and the first positioning assembly, and the fixing mechanism capable of reciprocating in a first direction to make the spare material tape fixed thereby align with the working material tape fixed by the first positioning assembly; and
an adhesive attaching mechanism comprising an adhesive attaching driver, suction plates and a swing assembly, two suction plates mounted at a driving end of the adhesive attaching driver and capable of being folded or unfolded under driving of the adhesive attaching driver, and the swing assembly capable of driving the adhesive attaching driver to swing between an adhesive preparation position and an adhesive attaching position;
wherein when the adhesive attaching driver is located at the adhesive preparation position, the two unfolded suction plates are capable of receiving and sucking adhesive pieces; and when the adhesive attaching driver swings to the adhesive attaching position, the two unfolded suction plates are located on an upper side and a lower side of the aligned spare material tape and working material tape, respectively, and as the adhesive attaching driver drives the two suction plates to be folded, the adhesive pieces sucked by the suction plates are attached to the aligned spare material tape and working material tape;
wherein the fixing mechanism is fixedly connected with the unreeling mechanism to make the first unreeling assembly and the second unreeling assembly be capable of moving in the first direction with the fixing mechanism, synchronously.

2. The coil replacing device of claim 1, further comprising a base plate and a transmission mechanism, the unreeling mechanism further comprising a moving plate slidably mounted on the base plate in the first direction, the first unreeling assembly, the second unreeling assembly and the fixing mechanism mounted on the moving plate, and the transmission mechanism capable of driving the moving plate to slide in the first direction to drive the fixing mechanism to reciprocate in the first direction.

3. The coil replacing device of claim 2, wherein the unreeling mechanism further comprises a vertical plate mounted on the moving plate and extending in a direction perpendicular to a surface of the base plate, and the first unreeling assembly and the second unreeling assembly are both arranged on the vertical plate.

4. The coil replacing device of claim 1, wherein the fixing mechanism passes through a first position and a second position while reciprocating in the first direction, the tape connecting mechanism further comprises a second positioning assembly and a second cutting assembly located upstream of the second positioning assembly, and the second positioning assembly is located at a side of the first positioning assembly in the first direction and is spaced from the first positioning assembly; and
when the fixing mechanism passes through the first position, the first fixing assembly is aligned with the second positioning assembly, and the second fixing assembly is aligned with the first positioning assembly, the spare material tape unreeled by the first unreeling assembly passes through the second cutting assembly and the second positioning assembly in sequence, and the second cutting assembly is capable of cutting off the spare material tape fixed by both the first fixing assembly and the second positioning assembly.

5. The coil replacing device of claim 4, wherein the second cutting assembly comprises an upper cutter, a lower cutter and a cutting driver, the spare material tape unreeled by the first unreeling assembly is supported by the lower cutter when passing through the second cutting assembly, and the lower cutter is located on a side, facing away from the second positioning assembly, of the upper cutter.

6. The coil replacing device of claim 5, wherein the second positioning assembly comprises a supporting plate, a pressing rod and an elastic member, the pressing rod is capable of pressing the spare material tape on a supporting surface of the supporting plate under an action of the elastic member, the lower cutter is fixedly connected with the supporting plate, and a supporting surface of the lower cutter is flush with the supporting surface of the supporting plate.

7. The coil replacing device of claim 6, wherein a guide groove for the spare material tape to pass through is formed in a surface of the supporting plate.

8. The coil replacing device of claim 4, wherein the tape connecting mechanism further comprises a third positioning assembly and a third cutting assembly located upstream of the third positioning assembly, the third positioning assembly is located on a side, facing away from the second positioning assembly of the first positioning assembly and is spaced from the first positioning assembly, and
when the fixing mechanism passes through the second position, the first fixing assembly is aligned with the first positioning assembly, the second fixing assembly is aligned with the third positioning assembly, the spare material tape unreeled by the second unreeling assembly passes through the third cutting assembly and the third positioning assembly in sequence, and the third cutting assembly is capable of cutting off the spare material tape fixed by both the second fixing assembly and the third positioning assembly.

9. The coil replacing device of claim 1, wherein the tape connecting mechanism further comprises a first driver connected with the first cutting assembly in a driving mode and capable of driving the first cutting assembly to move close to or away from the material tape between the first positioning assembly and the fixing mechanism.

10. The coil replacing device of claim 1, further comprising an adhesive preparation mechanism capable of cutting unreeled adhesive tape into adhesive pieces and transporting the adhesive pieces to surfaces of the suction plates located at the adhesive preparation position.

11. The coil replacing device of claim 10, wherein the adhesive preparation mechanism comprises an adhesive tape unreeling assembly, a pulling assembly and a cutting assembly, the adhesive tape unreeling assembly is for unreeling the adhesive tape, the pulling assembly is for pulling a preset length of adhesive tape above the suction plates, and the cutting assembly is for cutting the adhesive tape between the pulling assembly and the adhesive tape unreeling assembly to obtain the adhesive pieces loaded by the suction plates.

12. The coil replacing device of claim 11, wherein the adhesive preparation mechanism further comprises a depressing assembly capable of fixing the adhesive tape between the pulling assembly and the adhesive tape unreeling assembly and driving the fixed adhesive tape to move toward the suction plates until the adhesive tape above the suction plates is sucked by the suction plates.

13. The coil replacing device of claim 12, wherein the adhesive preparation mechanism further comprises a supporting base and a connecting plate slidably connected with the supporting base, and the depressing assembly comprises a pressing cylinder, a first clamping jaw and a second clamping jaw;

the pressing cylinder is fixed to the connecting plate, the first clamping jaw is fixed to a moving end of the pressing cylinder, and the second clamping jaw is arranged below the first clamping jaw and fixedly connected with the connecting plate;

the adhesive tape pulled by the pulling assembly is capable of passing between the first clamping jaw and the second clamping jaw, the first clamping jaw is capable of cooperating with the second clamping jaw to clamp the adhesive tape under the driving by the pressing cylinder, and as the connecting plate slides towards the suction plates, the depressing assembly drives the clamped adhesive tape to move towards suction surfaces of the suction plates.

14. The coil replacing device of claim 10, wherein the adhesive attaching mechanism further comprises a transfer assembly capable of driving the adhesive attaching driver to move in the first direction to make the two suction plates sequentially pass through a position for receiving the adhesive pieces output by the adhesive preparation mechanism, when the adhesive attaching driver is located at the adhesive preparation position.

15. The coil replacing device of claim 14, wherein when the adhesive attaching driver is located at the adhesive attaching position, the transfer assembly is further capable of driving the adhesive attaching driver to move in the first direction so that the two suction plates are capable of clamping the spare material tape and the working material tape aligned between the first positioning assembly and the fixing mechanism, when the two suction plates are folded.

16. The coil replacing device of claim 15, wherein the transfer assembly comprises a first transfer structure and a second transfer structure, the first transfer structure is capable of driving the adhesive attaching driver to move in the first direction to make the two suction plates sequentially pass through the position for receiving the adhesive pieces output by the adhesive preparation mechanism, and the second transfer structure is capable of driving the adhesive attaching driver to move in the first direction so that the two suction plates are capable of clamping the spare material tape and the working material tape aligned between the first positioning assembly and the fixing mechanism, when the two suction plates are folded.

17. The coil replacing device of claim 16, wherein the first transfer structure comprises a first slide plate and a first transfer cylinder, and the second transfer structure comprises a second slide plate and a second transfer cylinder; and the second slide plate is slidably mounted on the first slide plate in the first direction, the adhesive attaching driver is mounted on the second slide plate, the first slide plate is capable of being driven by the first transfer cylinder to slide in the first direction, and the second transfer cylinder is mounted on the first slide plate and capable of driving the second slide plate to slide in the first direction.

18. The coil replacing device of claim 1, wherein the swing assembly comprises a support, a swing base and a swing driver, the swing base is rotatably mounted on the support, the adhesive attaching driver is fixedly mounted on the swing base, and the swing driver is capable of driving the swing base to rotate to make the swing base drive the adhesive attaching driver to swing between the adhesive preparation position and the adhesive attaching position.

19. The coil replacing device of claim 18, wherein the swing base is rotatably mounted on the support through a pin shaft, the swing assembly further comprises a connecting rod, an end of the connecting rod is fixedly connected with the pin shaft, another end of the connecting rod is hinged to a moving end of the swing driver, and the moving end of the swing driver stretches out and draws back controllably, and drives the pin shaft to rotate through the connecting rod.

* * * * *